(No Model.)  5 Sheets—Sheet 1.

E. E. CLAUSSEN.
SCREW MACHINE.

No. 502,923.  Patented Aug. 8, 1893.

Witnesses:
William A. Lorenz
William H. Honiss

Inventor:
Edward E. Claussen (No Model.) 5 Sheets—Sheet 2.

E. E. CLAUSSEN.
SCREW MACHINE.

No. 502,923. Patented Aug. 8, 1893.

Witnesses:
William A. Lorenz.
William H. Honiss

Inventor:
Edward E. Claussen (No Model.)  5 Sheets—Sheet 3.

E. E. CLAUSSEN.
SCREW MACHINE.

No. 502,923. Patented Aug. 8, 1893.

Witnesses:
William A. Lorenz
William H. Honiss

Inventor:
Edward E. Claussen (No Model.) 5 Sheets—Sheet 4.
E. E. CLAUSSEN.
SCREW MACHINE.
No. 502,923. Patented Aug. 8, 1893.
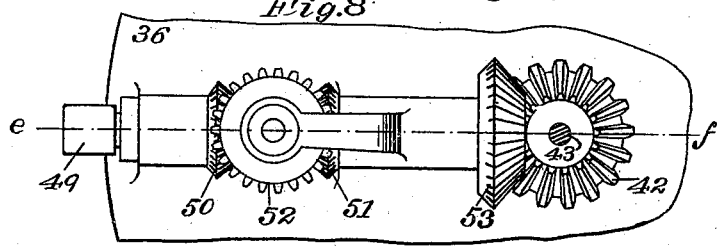
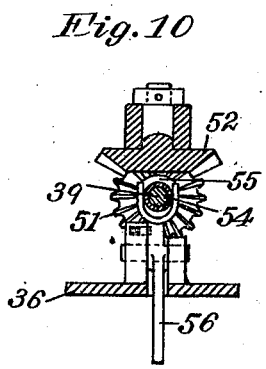
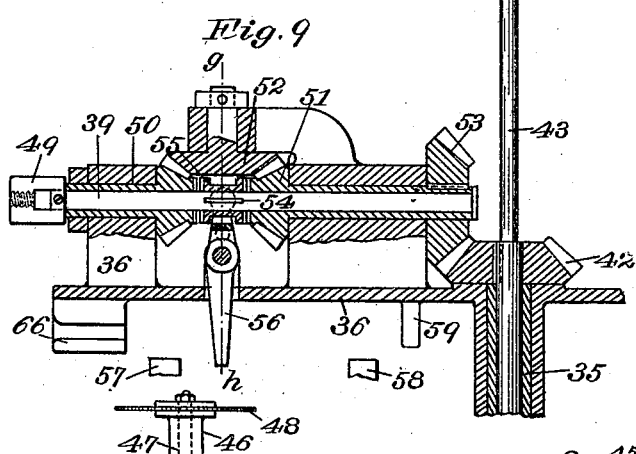
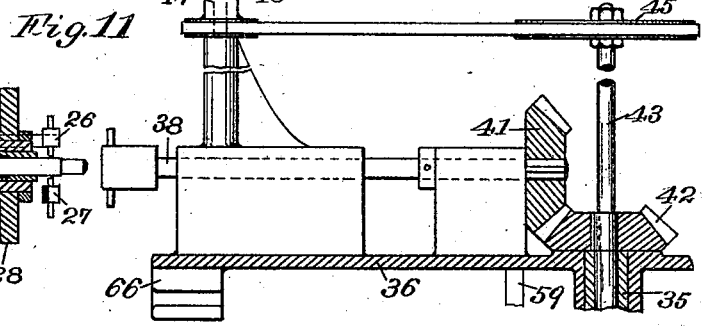
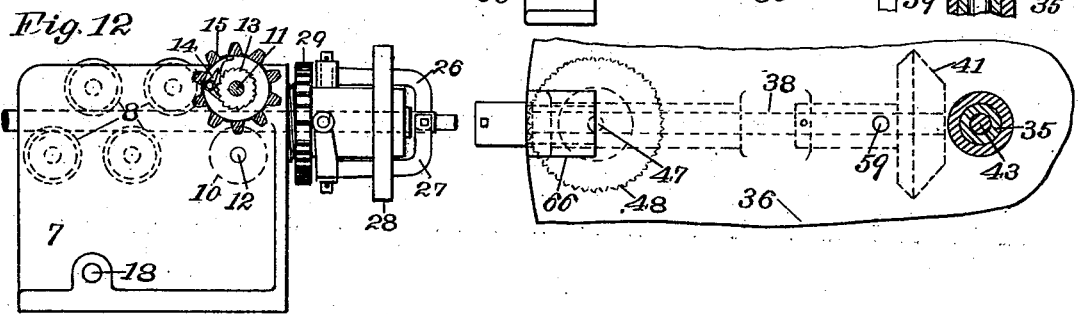
Witnesses:
William A. Lorenz
William H. Honiss
Inventor:
Edward E. Claussen (No Model.) 5 Sheets—Sheet 5.
E. E. CLAUSSEN.
SCREW MACHINE.
No. 502,923. Patented Aug. 8, 1893.
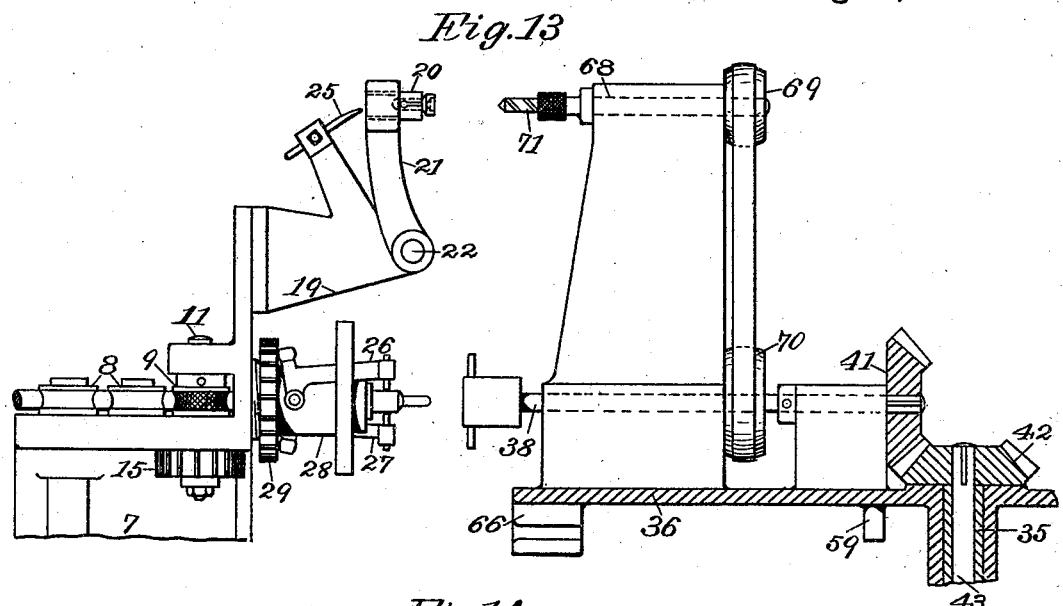
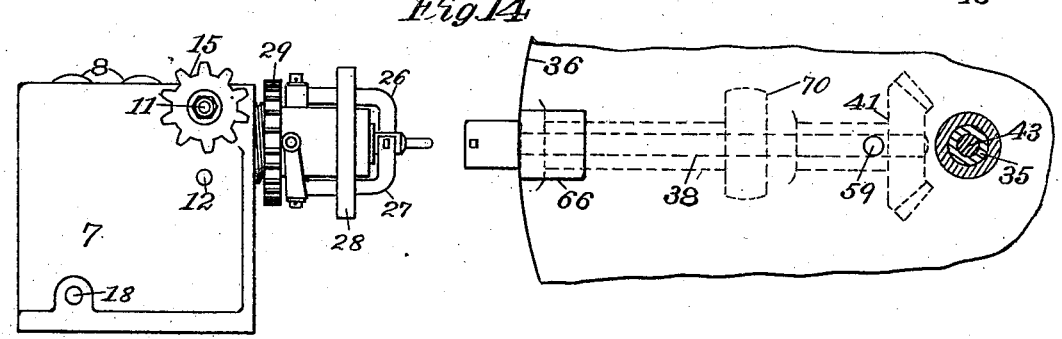
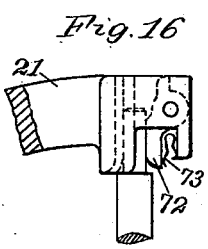
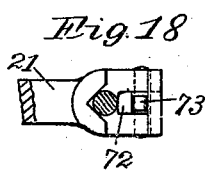
Witnesses:
William A. Lorenz
William H. Honiss
Inventor:
Edward E. Claussen

UNITED STATES PATENT OFFICE.

EDWARD E. CLAUSSEN, OF HARTFORD, CONNECTICUT, ASSIGNOR OF ONE-HALF TO EMIL F. LINKE AND GEORGE MORTSON, OF SAME PLACE.

SCREW-MACHINE.

SPECIFICATION forming part of Letters Patent No. 502,923, dated August 8, 1893.

Application filed May 19, 1892. Serial No. 433,525. (No model.)

*To all whom it may concern:*

Be it known that I, EDWARD E. CLAUSSEN, a citizen of the United States, residing at Hartford, in the county of Hartford and State of Connecticut, have invented certain new and useful Improvements in Screw-Machines, of which the following is a specification, and which is illustrated by the accompanying five sheets of drawings.

My invention relates to improvements in machines for making screws and similar articles from a coil or indefinite length of wire, in which the wire is held against rotation and is presented to the action of revolving tools which shape and finish those articles as may be desired.

It relates also to improved auxiliary devices for removing and reversing the screws, and for performing any desired operation, such as slotting, drilling, or turning, upon the reverse end of the screw or piece of work by means of auxiliary spindles, without delaying or hindering the action of the principal tool spindles upon the succeeding blank.

Figure 1:
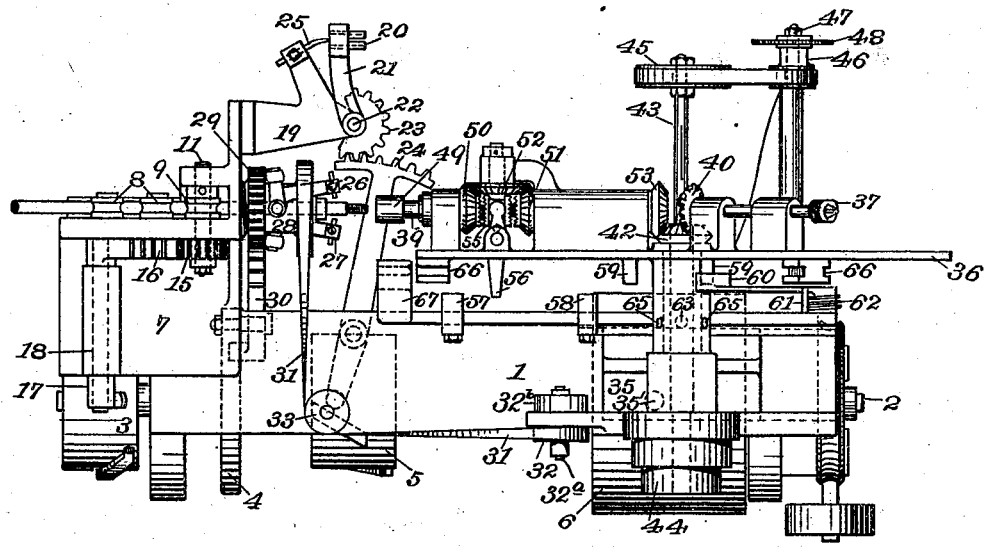
Figure 2:
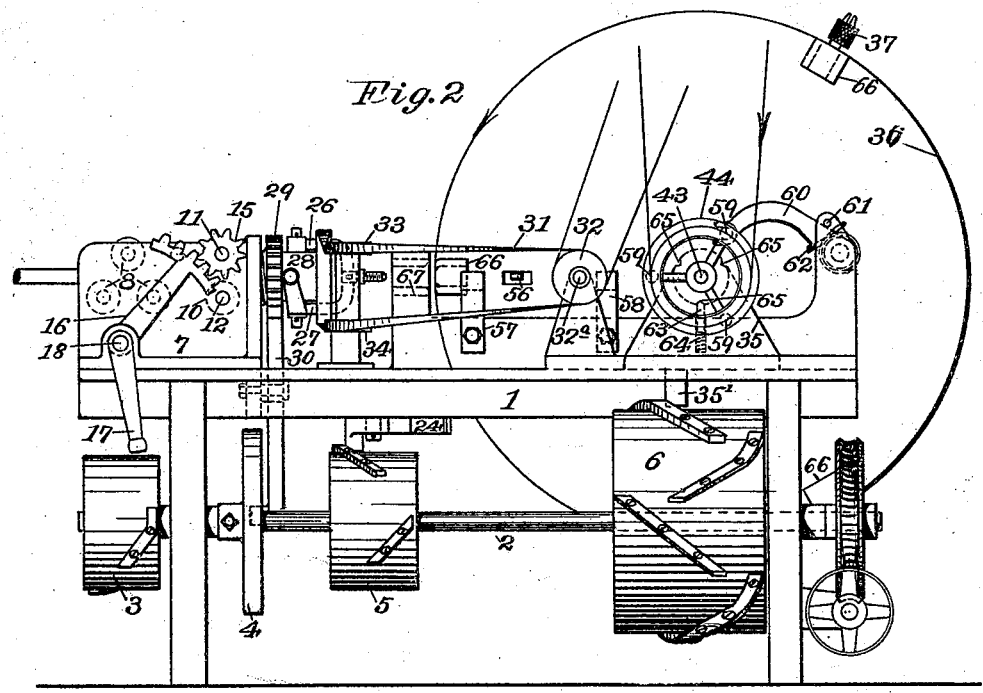
Figure 4:
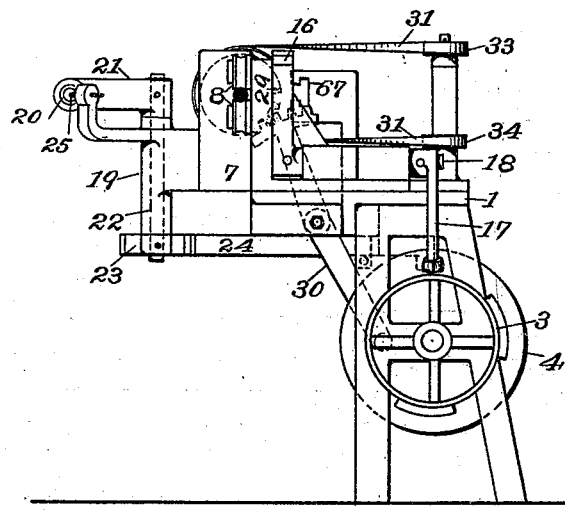
Figure 3:
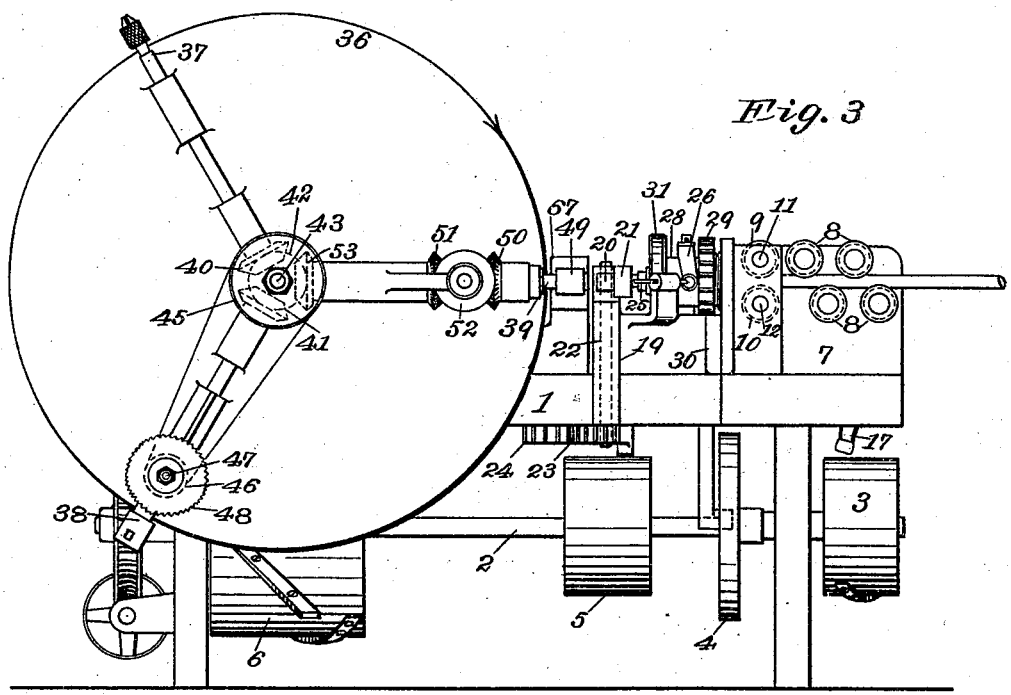
Figure 6:
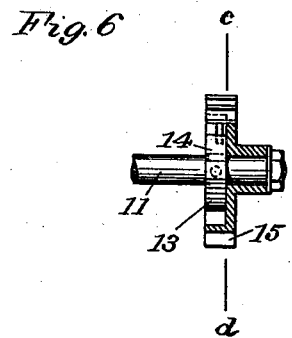
Figure 7:
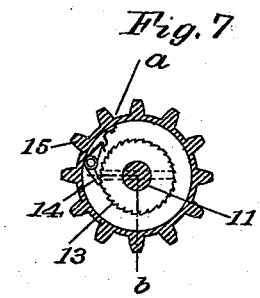
Figure 5:
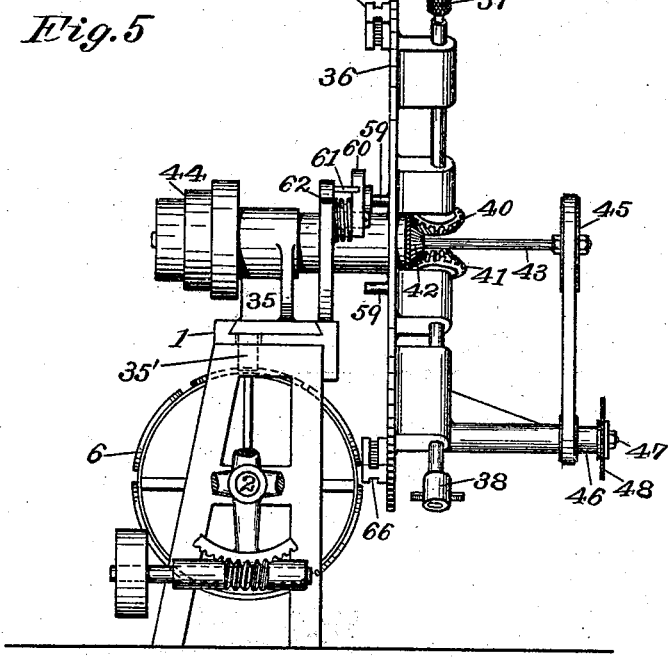

Figure 1 of the drawings is a plan view of my improved machine. Figs. 2 and 3 are front and rear views of the same. Figs. 4 and 5 are views of the left and right hand ends respectively of the machine of Fig. 2, the terms "left" and "right" having reference to those directions as they appear in that figure. Figs. 6 and 7 are respectively end and front views, partly in section, of my wire feeding device, the section represented in Fig. 6 being taken on the line $a$—$b$ of Fig. 7, while the section shown in Fig. 7, is taken on the line $c$—$d$ of Fig. 6. Fig. 8 is a rear view of the threading spindle. Fig. 9 is a plan view showing a section taken on line $e$—$f$ of Fig. 8. Fig. 10 is a view of a section taken on the line $g$—$h$ of Fig. 9 looking from the left hand in that figure. Fig. 11 is a plan view, partly in section, of my wire feeding and cutting off devices, showing the cutting down spindle and the slotting attachment in their operative positions, and showing also the means by which they are actuated. Fig. 12 is a front view partly in section of what is shown in Fig. 11. Fig. 13 is a plan view of a modification of my auxiliary device, by means of which the work may be drilled or recessed in its reverse end by an auxiliary tool while the principal tools are engaged upon the succeeding piece. Fig. 14 is a front view of what is shown in Fig. 13. Fig. 15 shows enlarged side and end views of such a piece of work as the devices shown in Figs. 13 and 14 are adapted to produce. Figs. 16, 17, and 18 are plan, side, and end views respectively of a modification of the chuck for seizing the screw or other piece of work.

I will first describe the construction and mode of operation of each section of this machine, and afterward describe their combined mode of operation.

*The driving mechanism.*—The numeral 1 represents the main bed or frame which supports the various mechanisms. The main shaft 2 is journaled in the frame and is driven by a worm wheel, worm, and pulley in the usual manner; and carries the feed cam 3, the cutting off cam 4, the extractor cam 5, and the turret slide cam 6.

The feed mechanism is carried on a bracket 7 bolted to the main frame and consists of the straightening rolls 8 which revolve on studs fixed in the bracket 7; and of the feed rolls 9 and 10 fixed on shafts 11 and 12 which are journaled in the bracket 7. One or both of the feeding rollers may be roughened or grooved, as shown in Fig. 13, for the more secure holding of the rod or wire. The shaft 11 has fixed upon it the ratchet wheel 13 which is advanced by the pawl 14 carried on the side of the pinion 15 which turns loosely on the outer end of the shaft 11. The pinion 15 engages with the sector 16 which receives a suitable motion from the cam 3 through the arm 17 and shaft 18.

The extractor mechanism is mainly carried on a bracket 19, bolted to the bracket 7 and consists of a split chuck 20 adapted to the size of screw to be held. That chuck is fixed in the arm 21, which is pivoted on the shaft 22, that shaft being journaled on the bracket 19. The lower end of the shaft 22 has fixed upon it the sector pinion 23 which engages with the sector 24 journaled on the main frame 1, and which receives its required motion from the cam 5. That motion causes the arm 21 to make about a half revolution from the position in which it appears in Fig. 1, so as to allow the chuck 20 to engage the body of the blank just before that blank is severed from the rod. An extractor pin 25 is held in an extension of the bracket 19, in such a position that it will force the blank out of the chuck 20 when that chuck is carried toward the pin.

The cutting off mechanism, best seen in Figs. 11 and 12 consists of a carrier 28 which revolves freely on an extension 7' of the bracket 7, and has pivoted upon it the oppositely disposed cranked arms 26 and 27. That extension 7' also carries a bushing through which the wire rod is fed, so that the position of the rod is concentric with that of the carrier 28, and concentric therewith is also a threaded portion of the bracket 7 on which is fitted a face plate 29. The periphery of that face plate is provided with gear teeth, and it receives its required rotary motion from the cam 4 by means of the sector 30 pivoted on the bracket 7. That rotary motion of the face plate advances it on its thread against the bearing ends of the arms 26 and 27, causing their opposite ends which carry the cutting off tools, to move toward the center of the blank for the purpose of severing it from the wire rod. The carrier 28 is driven by means of the belt 31 from the pulley 32 on the shaft 32ª, on the opposite end of which is a pulley 32ᵇ which is driven from any convenient countershaft. The belt 31 is guided between the pulley 32 and carrier 28 by the guide pulleys 33, 34. With this device I am enabled to begin the operation of cutting off before the revolving tool spindles have completed their operation upon the blank.

The turret mechanism is carried upon a slide 35 which reciprocates in ways on the frame 1 as best shown in Fig. 5. This reciprocation at suitable times and to the desired extent is communicated by the cam 6 to the slide 35 by means of an extension 35' of the latter, which engages with that cam. Upon the slide 35 and with its axis at right angles to the motion thereof, is journaled the turret or monitor head 36 carrying the principal tool spindles 37, 38 and 39. Those spindles are journaled in the turret 36 with their axes radial to the center thereof, and that center, which is also coincident with the center of the bearing of the turret upon the slide, is established in the same horizontal plane with the axis of the wire rod when in position to be operated upon. The axes of the spindles 37, 38, and 39, also lie in the same vertical plane with the axis of the wire rod. The spindles 37 and 38 are provided at their inner ends with bevel gears 40 and 41 which engage with the bevel gear 42, fixed on the shaft 43 which extends through the slide 35 concentrically with the bearing of the turret thereon. This shaft turns freely in the slide and has fixed on its front end a cone pulley 44 which receives motion by means of a belt from any convenient shaft. The opposite end of the shaft 43 is extended beyond the gear 42 and has fixed upon it the pulley 45 from whence a belt transmits motion to the saw spindle 46 which turns freely on a stud 47 fixed to a projection of the turret 36. The position of the saw 48 and its connections is so established with relation to the extractor chuck 20, as that they shall come into proper operative relation for slotting the screw, when the extractor arm is in the position shown in Fig. 1 and the saw is in the position shown in Figs. 11 and 12.

The spindles 37 and 38 may be adapted to hold any tools suitable for the shaping or turning of the articles to be made.

The spindle 39 as shown in the drawings is adapted to carry a threading tool 49 and is provided with means for reversing and retracting the die or tap, without reversing the direction of rotation of the shaft 43 from which it is driven. The construction of this device is best shown in Figs. 9 and 10. Journaled in the turret 36 concentric with the spindle 39 are the bevel gears 50 and 51. These gears engage with the intermediate gear 52 also journaled in the turret. The gear 51 has fixed upon it the gear 53 which engages with and is driven by the gear 42. The spindle 39 has upon it the spline 54 which engages the clutch 55, while permitting that clutch to slide endwise on the shaft 39 in order that it may engage with and be driven by either of the gears 50 or 51 by means of the teeth on the faces thereof. The clutch may also remain out of engagement with both gears, in which case the spindle 39 remains stationary. The clutch is operated by one end of the lever 56 pivoted on the turret 36. The other end of that lever is thrown backward and forward by colliding with the stops 57 and 58 adjustably fastened on the frame 1. The gears 50, 51, 52, and 53 are driven continuously by the gear 42. The gear 51 revolves in one direction while the gear 50 revolves in the opposite direction, so that the spindle 39 will revolve in one direction when its clutch engages with the gear 51 and in the opposite direction when that clutch engages with the gear 50.

The tool spindles are brought into their operative position by intermittent partial revolutions of the turret 36. As the slide 35 moves back, or from left to right as seen in Fig. 2, one of the index pins 59 comes in contact with the pawl 60 which is pivoted on the frame 1 and is held upward against the stop 61 by the spring 62. As the backward movement of the slide continues, the turret is caused to make a partial revolution, bringing the next spindle to its forward or operative position. The turret is secured in its different positions by the bolt 63 in the slide 35, which is pressed by the spring 64 into the recesses 65 in the turret 36. As the slide moves forward to bring the tools into engagement with the work, the turret 36 is also more securely held against lateral movement by the projections 66, each of which, when its corresponding spindle is in operative position, is adapted to engage with and be steadied by the guide 67 on the bed 1.

The combined and consecutive operation of the above described mechanisms is as follows:—The end of a coil or length of wire is placed in position between the straightening and feeding rolls and is fed forward a distance agreeing with the length of the screw to be made. Then the principal tool spindles are presented to it in their proper consecutive order, and perform their desired operations upon the blank, those spindles being revolved by their geared connection with the gear 42, and being fed forward with the slide 35 by the cam 6. If the blank is to be tapped or threaded the spindle 39 is provided with a suitable tool, and that tool is fed into or upon the work with the clutch 55 in engagement with the gear 50. The stop 57 is so adjusted that the end of the lever 56 will collide with it at the proper moment and cause the clutch 55 to disengage with the gear 50 and engage with the gear 51. At the same moment the slide 35 stops its forward movement and goes backward in time with the tap or die as it leaves the work. At the backward end of the stroke the lever 56 collides with the stop 58 throwing the clutch forward into engagement with the gear 50, ready for the next piece. Before the operations on the body of the blank are fully completed the cutting off mechanism may begin, in the manner previously described, to sever the blank from the rod. Meanwhile the extractor arm swings forward far enough to allow the chuck 20 to pass upon the body of the blank, and when that blank is severed from the rod the arm 21 returns to the position shown in Fig. 1, carrying the screw held in the chuck 20, so that the longitudinal position of the screw is reversed as compared with its former position on the rod. The arm 21 remains in the position shown in Fig. 1, until the slotting saw 48 comes into the position shown in Figs. 11 and 12 when it advances against the blank and cuts the desired slot therein. Then the arm 21 is caused by the cam 5 to swing still farther back, so that the pin 25 pushes the blank out of the chuck 20 whence it falls into a convenient box.

It will be seen that suitable adaptations of these improved devices will produce many kinds of objects other than screws. Some of these objects, like that shown in Fig. 15, are of such a form that it has been difficult and expensive to produce them by the hitherto existing methods, by which, after one end had been finished they were discharged from the machine, to be rechucked and finished by a separate operation. By means of my improved devices both ends of such a piece of work may be finished before releasing it. Figs. 13 and 14 represent an adaptation for recessing the reverse end of a piece similar to that shown in Fig. 15, in which a drill spindle 68 is journaled on the turret 36, and has fixed upon it the pulley 69, which receives motion from the pulley 70 on the shaft 38. As the turret advances to bring the tool on the spindle 38 into operation upon the rod, the auxiliary tool 71 operates upon the blank held in the chuck 20.

Figs. 16, 17 and 18 represent a modification of the chuck 20; the end of the arm 21 has upon it a recess in the form of a V, into which the blank is pressed by the jaw 72 actuated by the spring 73. As the arm 21 oscillates into the position to grasp the screw the end of the arm 21 describes an arc of a circle and therefore its path does not exactly coincide with the straight lines of the sides of the screw; but the yielding jaw 72 springs open sufficiently to allow the screw to enter.

I claim as my invention—

1. In combination with means for holding a rod or wire from rotating, a series of revolving spindles, and an intermittently rotating turret on which those spindles are journaled, arranged and operating to present those spindles successively to that rod or wire, all substantially as described.

2. In combination with means for holding a rod or wire from rotating, a series of revolving spindles radially journaled on a turret or head which is capable of intermittent rotation, a revolving shaft concentric with the axis of that turret, and gears by means of which a rotary motion is communicated from that shaft to those spindles, substantially as described.

3. In combination with means for holding a rod or wire from rotating, a series of revolving spindles journaled on an intermittently rotating turret, and a reciprocating slide on which that turret is mounted, arranged and operating to advance and retract those spindles to and from the rod as they are successively presented to it substantially as described.

4. The combination of a revolving carrier having oppositely disposed cranked tool arms pivoted thereon, a threaded face plate adjacent to that carrier and mechanism for rotating that plate face upon its thread whereby it is advanced against the bearing ends of those arms substantially as described.

5. In combination with means for holding a rod or wire from rotating, a revolving carrier having oppositely disposed tool arms pivoted thereon, and a threaded face plate adapted to be rotated and advanced upon its thread against the bearing ends of those arms, and operating to force their tool carrying ends toward the center of the rod for the purpose set forth, all substantially as described.

6. In combination with means for holding a rod or wire from rotating, an oscillating arm or carrier 21 provided with a chuck, the pinion gear 23 rigidly connected with that arm, the sector gear 24 and the cam 5, all adapted to swing that chuck into alignment with the rod or wire after one end of a blank has been operated upon by a series of principal tools located in the plane of the rod, and operating to seize and reverse that blank and to present its reverse or unfinished end to the action of auxiliary tools in another plane; substantially as described.

7. An intermittently rotating turret having journaled thereon a series of revolving principal spindles located in the plane of the blank to be operated upon, and carrying also an auxiliary revolving spindle which lies in a different plane from that of the principal spindles, an oscillating arm adapted to engage the blank when the principal spindles have performed their work thereon and operating to carry that blank from the plane of the principal spindles and to present its reverse or unfinished end to the action of the auxiliary spindle, substantially as described.

8. In combination with means for holding a rod or wire from rotating, an intermittently rotating turret provided with the spindle 39, a slide on which that turret is mounted, gears 50 and 51 with means for rotating them continuously in opposite directions, the clutch 55, lever 56, and stops 57 and 58, whereby the spindle 39 is rotated with the gear 50 or with the gear 51, all substantially as described and for the purpose specified.

EDWARD E. CLAUSSEN.

Witnesses:
WILLIAM A. LORENZ,
WILLIAM H. HONISS.